Figure 1:
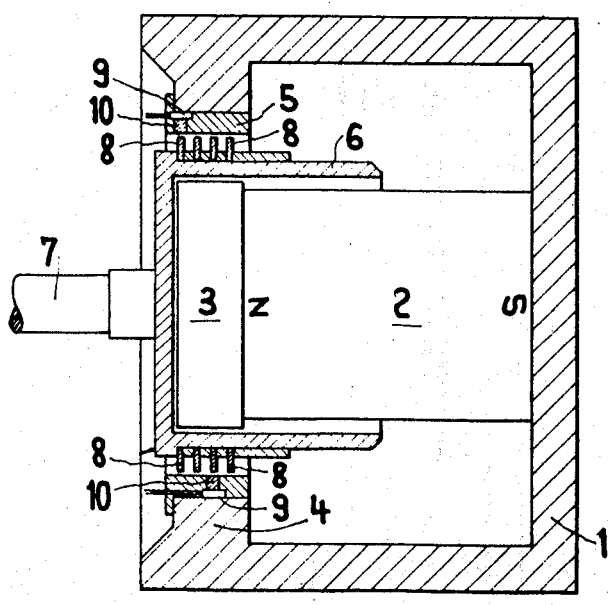

United States Patent

[11] 3,568,180

| [72] | Inventor | Eduard Rosch<br>Le Locle, Switzerland |
|---|---|---|
| [21] | Appl. No. | 679,838 |
| [22] | Filed | Nov. 1, 1967 |
| [45] | Patented | Mar. 2, 1971 |
| [73] | Assignee | Dixi S. A., Le Locle<br>Neuchatel, Switzerland |

[54] ENCODER
10 Claims, 3 Drawing Figs.

[52] U.S. Cl. ........................................ 340/347, 179/100.2
[51] Int. Cl. ........................................ G08c 9/04
[50] Field of Search ........................... 340/347; 179/100.2, (CH)

[56] References Cited
UNITED STATES PATENTS

| 2,978,545 | 4/1961 | Howling | 179/100.2 |
| 3,007,067 | 10/1961 | Snyder | 340/347X |
| 3,037,092 | 5/1962 | Neumann et al. | 179/100.2 |
| 3,041,414 | 6/1962 | Gratian | 179/100.2 |
| 3,051,943 | 8/1962 | Simon et al. | 340/347 |
| 3,077,520 | 2/1963 | Fleming et al. | 179/100.2 |
| 3,251,054 | 5/1966 | Simon | 340/347 |
| 3,274,575 | 9/1966 | DeKoster | 340/174.1 |

*Primary Examiner*—Maynard R. Wilbur
*Assistant Examiner*—Gary R. Edwards
*Attorney*—Edward T. Connors ABSTRACT: An encoder having a number of output circuits including each a resistor of which the resistance value depends on the magnetic field intensity in it, the field intensity being controlled by a code track associated with each resistor.

PATENTED MAR 2 1971 3,568,180

INVENTOR
Eduard Rösch

ENCODER

This invention relates to an encoder with a displaceable part and a stator, in which a number of code outputs are controllable each by variation of a magnetic path.

Prior encoders of this type comprise coils in the output circuits, in which different voltages are induced according to the relative position of the displaceable part and the stator. If these prior encoders should operate at least approximately independently of the speed, alternating fields of relatively high frequency must be induced, this resulting in complicated and expensive devices. Operation with fields produced by permanent magnets is impossible.

It is the aim of the present invention to provide a substantially simpler encoder of which the output is controllable by variations of magnetic paths, but in which it is possible to use permanent magnetic fields. The encoder according to this invention is characterized in that a resistor of which the resistance value depends on the magnetic field intensity and connected into an output circuit is disposed in each of a number of magnetic paths the said field intensity in each magnetic path and resistor respectively being determined by an associated code track. The expensive and voluminous coils may thus be omitted and it is possible to obtain fully static operation with permanent magnetic fields.

Figure 2:
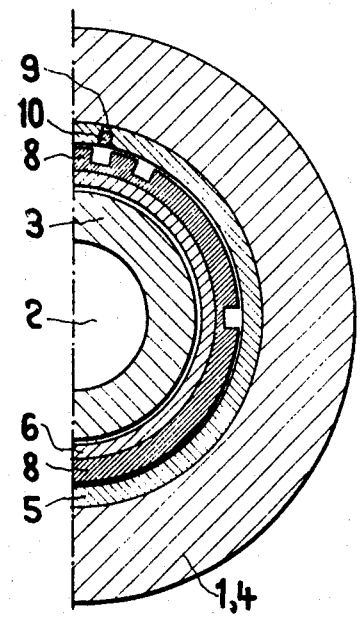
Figure 3:
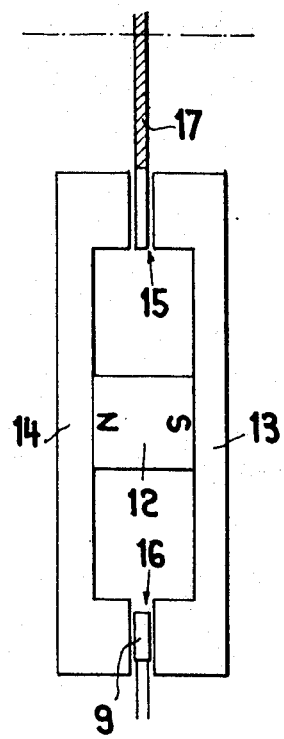

Two embodiments of the encoder according to the invention are illustrated, by way of example, in the drawing:

FIG. 1 shows the first embodiment in axial section,
FIG. 2 shows the first embodiment in radial section, and
FIG. 3 shows the second embodiment.

The encoder according to FIGS. 1 and 2 has a pot 1 of soft iron in which a cylindrical permanent magnet 2 is coaxially disposed. A ring 3 of soft iron is applied to the free end of the permanent magnet 2. The pot 1 has an inwardly projecting flange 4, having at its inner side a ring 5 of nonmagnetizable material, for instance brass. Between the rings 3 and 5 is rotatably disposed a sleeve-shaped rotor 6 of soft iron, which is fixed on the driving shaft 7 of the encoder. Four axially staggered code rings or code tracks 8 of soft iron or the like suitable ferromagnetic material are disposed on the rotor 6. As indicated in FIG. 2, these code rings or tracks are toothed at their outer side in accordance with a determined code. Between the ring 5 and the inside surface of the flange 4, a resistor 9 of which the connecting wires are lead out between the flange 4 and the ring 5, is inserted into a suitable recess of the ring 5 within the range of each track 8. The resistance value of the resistors 9 substantially depends on the intensity of the magnetic field in which such resistors are disposed, and they are connected into an output circuit of the encoder in a manner not shown. For example, each resistor 9 is series connected with a fixed resistor to a current source and forms a variable voltage divider at the tapping of which the output signal may be collected. Between each resistor 9 and the track 8 associated therewith a ferromagnetic pole piece 10 of which the inner end is disposed as near as possible to the track, is inserted into an aperture of the ring 5.

The operation of the encoder illustrated in FIGS. 1 and 2 is as follows:

A magnetic field is produced in the air gap between the ring 3 and the flange 4 by the permanent magnet 2, this field being substantially concentrated in the radial planes of the tracks 8. When the pole piece 10 faces a gap of the associated track according to FIG. 2, the resistor is in a relatively weak magnetic field and thus has a corresponding resistance value, this being indicated by a determined potential condition in the output circuit. When the rotor is now somewhat turned so that a tooth or a segment of the associated track is now facing the pole piece 10, the magnetic flux substantially increases so that the field intensity acting onto the resistor 9 also increases and changes the resistance value accordingly. A corresponding other potential condition results in the output circuit. In this manner it is possible to uniquely characterize the position of the shaft 7 and the rotor 6, at the four outputs of the encoder, for instance by means of the four tracks provided in the example, with predetermined resolving power. As an example, it is possible without difficulty to uniquely determine 100 positions with a diameter of the code tracks of 50 mm. Resistors suitable for use in this encoder are disclosed in "Siemens Bauteile-Information," Heft 11, pages 17—23.

The resolving power may under circumstances be increased in that the cross section of the pole pieces 10 decreases from outside towards inside, such, that a relatively very small surface of the pole pieces is located immediately outside the outermost surfaces of the code tracks 8, whereas the field leaving the outer end of larger cross section of the pole pieces uniformly distributes itself onto the controllable portion of the resistor.

While two resistors only are shown in FIG. 1 by way of example, in fact four resistors are of course disposed at places distributed along the circumference, such, that a resistor is associated with each track of the encoder. As is generally usual with encoders of this type, pairs of resistors 9 may also be associated to the separate tracks according to a U-distribution or a V-distribution.

With the parallel-connection of the separate magnetic paths of several tracks of the encoder a certain mutual influence occurs in the sense that the magnetic flux in a predetermined track is not fully independent of the magnetic flux in the other tracks. Therefore, it may be required in particular cases, to provide an entirely independent magnetic circuit for each track of the encoder. Such an arrangement is shown by way of example in FIG. 3. In this embodiment yokes 13 and 14 of soft iron forming two parallel-connected air gaps 15 and 16 respectively are connected to a permanent magnet 12. The toothed rim of a rotatable code disc 17 of soft iron projects into the air gap 15. The field-sensititve resistor 9 is disposed in the air gap 16.

In this embodiment the field intensity in the air gap 16 and the resistor 9 respectively, and thus the resistance value of this resistor depends on whether a gap or a tooth of the code disc 17 is in the air gap 15. When a tooth of the code disc 17 is in the air gap 15. When a tooth of the code disc 17 is in the air gap 15, the magnetic flux in this air gap increases to the expense of the magnetic flux in the air gap 16, so that the field intensity in the resistor 9 decreases and its resistance value changes accordingly. Normally several systems according to FIG. 3 are provided, whereby the field changes in the resistor of the one system are entirely independent of the field changes in the other systems.

Of course another arrangement is also possible here, in that the two air gaps 15 and 16 are series connected by way of example instead of being parallel connected.

I claim:

1. Encoder comprising a stator and a rotor, stationary permanent magnet means and magnetic circuit means forming air gap means on said stator, a number of code tracks of ferromagnetic material mounted on said rotor and rotatable in said air gap means, the magnetic flux in said air gap means being locally controlled by each of said code tracks, a number of resistor means of which the resistance value depends on the magnetic flux therein mounted each of said stator and in said air gap means within reach of a flux portion controlled by one of said code tracks, and each of said resistor means being connected into an output circuit for transmitting a code signal depending on the magnetic flux in this resistor means and on the configuration of the associated code track respectively.

2. Encoder according to claim 1, wherein said permanent magnet is of substantially cylindrical form and fixed to the end wall of a pot of soft iron, an air gap being formed between the free end of said permanent magnet and the rim of said pot, a cylindrical portion of said rotor disposed in said air gap and surrounding said free end of the permanent magnet, a number of flat rings of ferromagnetic material mounted on said rotor and maintained in spaced position by spacing elements and a ring of nonmagnetizable material fixed to said rim of the pot, said resistor means being accommodated in said ring of nonmagnetizable material.

3. Encoder according to claim 1, wherein each resistor means and its associated code track are disposed in series in the same air gap.

4. Encoder according to claim 3, wherein a pole piece is inserted between each code track and resistor means.

5. Encoder according to claim 4, wherein the cross section of each pole decreases from its end adjacent the resistor means towards its end adjacent the code track.

6. Encoder according to claim 1, wherein common permanent magnet for several parallel-connected magnetic paths with a resistor in each is provided.

7. Encoder according to claim 6, wherein in that the resistors are disposed in circumferentially staggered positions.

8. Encoder according to claim 6, wherein a radial magnet field is set up in an air gap between a rotor and a stator, whereby several code tracks are disposed axially staggered on the rotor.

9. Encoder acccording to claim 1, wherein an independent magnetic path is associated with each of a number of resistors.

10. Encoder according to claim 9, wherein each magnetic path has two air gaps arranged in series or in parallel, whereby the resistor is disposed in one of the air gaps while a code track of ferromagnetic material displaceably engages into the other air gap.